United States Patent
Dyar

(10) Patent No.: US 8,888,113 B2
(45) Date of Patent: Nov. 18, 2014

(54) AIR BLADDER SUSPENSION

(71) Applicant: Royce Merrill Dyar, Cleveland, AL (US)

(72) Inventor: Royce Merrill Dyar, Cleveland, AL (US)

( * ) Notice: Subject to any disclaimer, the term of this patent is extended or adjusted under 35 U.S.C. 154(b) by 0 days.

(21) Appl. No.: 13/773,075

(22) Filed: Feb. 21, 2013

(65) Prior Publication Data

US 2014/0232086 A1    Aug. 21, 2014

(51) Int. Cl.
*B60G 9/04* (2006.01)
*B62K 25/00* (2006.01)
*B62K 25/04* (2006.01)

(52) U.S. Cl.
CPC ............... *B62K 25/04* (2013.01); *B62K 25/005* (2013.01)
USPC ......... 280/124.157; 280/124.11; 280/124.128

(58) Field of Classification Search
USPC ........................ 280/121.11, 124.128, 124.157
See application file for complete search history.

(56) References Cited

U.S. PATENT DOCUMENTS

| | | | | |
|---|---|---|---|---|
| 5,375,871 A | * | 12/1994 | Mitchell et al. | 280/124.116 |
| 5,427,404 A | * | 6/1995 | Stephens | 280/124.162 |
| 5,615,906 A | * | 4/1997 | Raidel, Sr. | 280/686 |
| 5,667,240 A | * | 9/1997 | Mitchell | 280/124.131 |
| 6,340,165 B1 | * | 1/2002 | Kelderman | 280/124.153 |
| 6,641,154 B1 | | 11/2003 | Vey | |
| 6,871,718 B2 | | 3/2005 | McGuire | |
| 7,726,674 B2 | * | 6/2010 | VanDenberg et al. | 280/124.128 |
| 7,980,577 B2 | * | 7/2011 | Vandenberg et al. | 280/124.128 |
| 8,235,403 B2 | * | 8/2012 | Vandenberg et al. | 280/124.116 |
| 8,256,782 B2 | * | 9/2012 | Vandenberg et al. | 280/124.128 |
| 8,328,211 B2 | * | 12/2012 | Vandenberg et al. | 280/124.116 |
| 8,348,290 B2 | * | 1/2013 | Mildner et al. | 280/124.109 |

* cited by examiner

*Primary Examiner* — Toan To

(57) ABSTRACT

An air bladder suspension. The air bladder suspension of the present invention may be used with a vehicle wheel and a tricycle add-on wheel. The air bladder suspension may include a cantilever or seesaw type configuration and absorb shock when the tire of the wheel hits a ripple or bump on a road.

20 Claims, 4 Drawing Sheets

AIR BLADDER SUSPENSION

BACKGROUND OF THE INVENTION

The present invention relates to a suspension for a vehicle and, more particularly, to an air bladder suspension.

Motorcycle tricycles may be used due to their increased stability as compared to a standard motorcycle. Therefore, it may be desirable to convert a motorcycle to a motorcycle tricycle. The conversion of a motorcycle to a motorcycle tricycle may involve a tricycle kit. A tricycle kit includes a two wheel device that may be attached to the motorcycle's chassis or frame. The two wheels of the device may be on either side of the rear wheel of the motorcycle. Therefore, the kit converts the motorcycle to a four wheel motorcycle, however the kit is called a tricycle kit because the motorcycle looks and feels like a motorcycle tricycle.

However, when the tricycle kits are installed, the bumps and ripples on the road may be enhanced. Therefore, when the tricycle kit's wheels hit the bumps and ripples, the ride may become rough and uncomfortable. Some of the tricycle kits may use shocks, torsion axles, or no suspension at all, which is insufficient in absorbing the ripples and bumps on the road. Some tricycle kits are directly attached to the rear wheel axle of the motorcycle, which may cause an even rougher ride.

As can be seen, there is a need for a suspension on tricycle kits that sufficiently absorbs shock.

SUMMARY OF THE INVENTION

In one aspect of the present invention a shock absorbing device comprising: at least one base supported by a frame; a shaft having a first end and a second end, wherein the shaft is rotatably connected to the base near the first end; a rocker arm having a front end and a rear end, wherein the shaft is connected in between the front end and the rear end of the rocker arm the near the second end; a spindle attached to the rocker arm near the rear end, wherein the spindle is rotatably connected to a wheel; and an air bladder supported by the at least one base, wherein the front end of the rocker arm is adjacent to a top of the air bladder.

In another aspect of the present invention, the base further comprises a bracket, and wherein the first end of the shaft is rotatably connected to the bracket.

In another aspect of the present invention, the bracket is a U-shaped bracket.

In another aspect of the present invention, the shaft is rotatably connected to the bracket by a flange bearing.

In another aspect of the present invention, the rear end of the rocker arm comprises a swivel plate, and the front end of the rocker arm comprises a connection piece.

In another aspect of the present invention, an air bladder plate is attached to the top of the air bladder, wherein the connection piece is secured to the bladder plate.

In another aspect of the present invention, the air bladder plate further comprises an air valve.

In another aspect of the present invention, the air valve is configured to receive an air pump.

In another aspect of the present invention, an air compressor is connected to the air valve via an airline hose.

In another aspect of the present invention, the air compressor is activated by a switch.

In another aspect of the present invention, the frame is a tricycle motorcycle frame or tricycle kit frame.

These and other features, aspects and advantages of the present invention will become better understood with reference to the following drawings, description and claims.

BRIEF DESCRIPTION OF THE DRAWINGS

FIG. 7 is a perspective view of the invention used in conjunction with item 52 trike add-on.

DETAILED DESCRIPTION OF THE INVENTION

Figure 1:
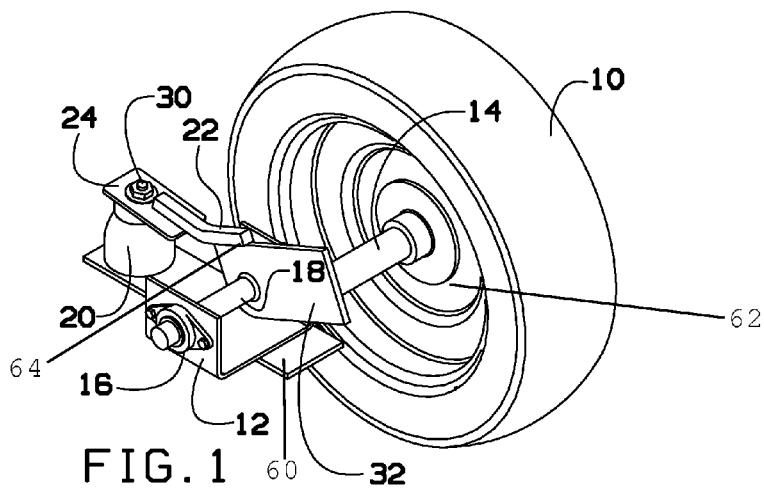
FIG. 1 is a perspective view of the invention.
Figure 2:
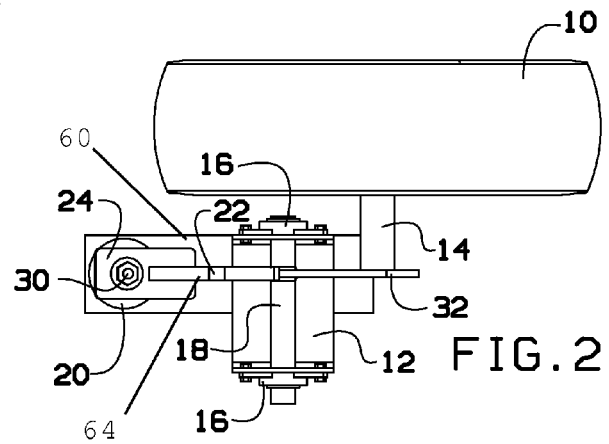
FIG. 2 is a top view of the invention.
Figure 3:
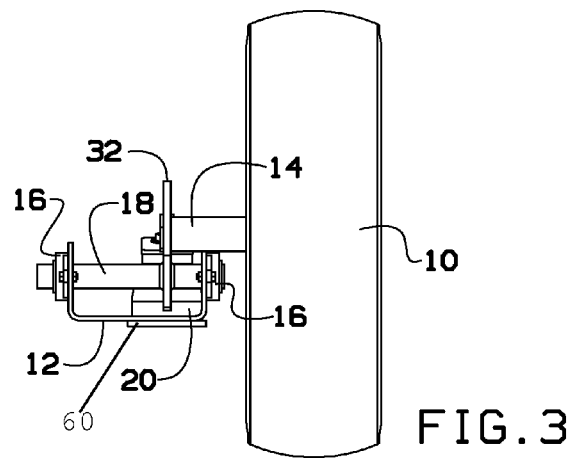
FIG. 3 is a rear view of the invention.

The following detailed description is of the best currently contemplated modes of carrying out exemplary embodiments of the invention. The description is not to be taken in a limiting sense, but is made merely for the purpose of illustrating the general principles of the invention.

Broadly, an embodiment of the present invention provides an air bladder suspension. The air bladder suspension of the present invention may be used in conjunction with a vehicle wheel and a tricycle add-on wheel. The air bladder suspension may include a cantilever or seesaw type configuration and may absorb shock when the tire of the wheel hits a ripple or bump.

The present invention may comprise an air bag suspension for motorcycle tricycles (trikes) and trike kits. The present invention provides an air bladder that may be attached to a rocker arm, which absorbs much of the road's imperfections, such as bumps and ripples. The present invention may be used with or without shocks, torsion axles and the like.

Referring to FIGS. 1 through 7, the present invention may include an air bag suspension. The air bag suspension may have a cantilever type configuration that may act as a seesaw. The air bag suspension may include at least one base 60. The base 60 may be attached to a trike add-on 52 frame, trike frame or vehicle frame. The base 60 may include a bracket 12, such as a U shaped bracket. In certain embodiments, the bracket 12 may be mounted near the rear of the base 60.

The present invention may further include a shaft 18 having a first end and a second end. The first end of a shaft 18 may be rotatably attached to the bracket 12. In certain embodiments, the bracket 12 may include a flange bearing 16, in which the shaft 18 may fit within and rotate within the flange bearing 16.

The air bag suspension may further include a rocker arm 64. The rocker arm 64 may have a front end and a rear end. The second end of the shaft 18 may be connected in between the front end and the rear end of the rocker arm 64. In certain embodiments, the rocker arm 64 may include one solid piece. However, the rocker arm may also include multiple pieces fastened together. For example, the rocker arm 64 may include a swivel plate 32 and a connection piece 22. In such embodiments, the shaft 18 may be connected to the swivel plate 32.

In certain embodiments, a spindle 14 may attach to the rocker arm 64 near the rear end. The spindle 14 may further attach to a wheel 62 and thereby connect the rocker arm 64 to a wheel 62. For example, the spindle 14 may connect with the swivel plate 32 of the rocker arm 64.

The present invention may further include an air bladder 20. The air bladder 20 may be supported by the at least one base 60. In certain embodiments, the air bladder 20 may be mounted near the front of the base 60 and thereby may be oriented in front of the shaft 18 and the spindle 14. The front end of the rocker arm 64 may be adjacent to the top of the air bladder 20. A balloon plate 24 may further be attached to the top of the air bladder 20, in between the air bladder 20 and the front end of rocker arm 64.

As mentioned above, the rocker arm 64 may include a swivel plate 32 and a connection piece 22. In such embodiments, the connection piece 22 may be fastened to the swivel plate 32 and may be adjacent to the top of the air bladder 20. In certain embodiments, the connection piece 22 may be secured directly to the balloon plate 24.

The air bladder 20 may include an air valve 30, in which air may enter the air bladder 20 and exit the air bladder 20. In certain embodiments, the bladder plate 24 may include the air valve 30. A user may fill the air bladder 20 using a manual pump such as a bicycle pump. An air gauge may be used to monitor the pressure. The air bladder 20 may be filled with the air pump when the vehicle is stopped. In certain embodiment, when the road crown is on the left side, then the user may add air to the left air bladder 20 and remove air from the right air bladder 20. When the road crown is on the right side, then the user may add air to the right air bladder 20 and remove air from the left air bladder 20.

Figure 6:
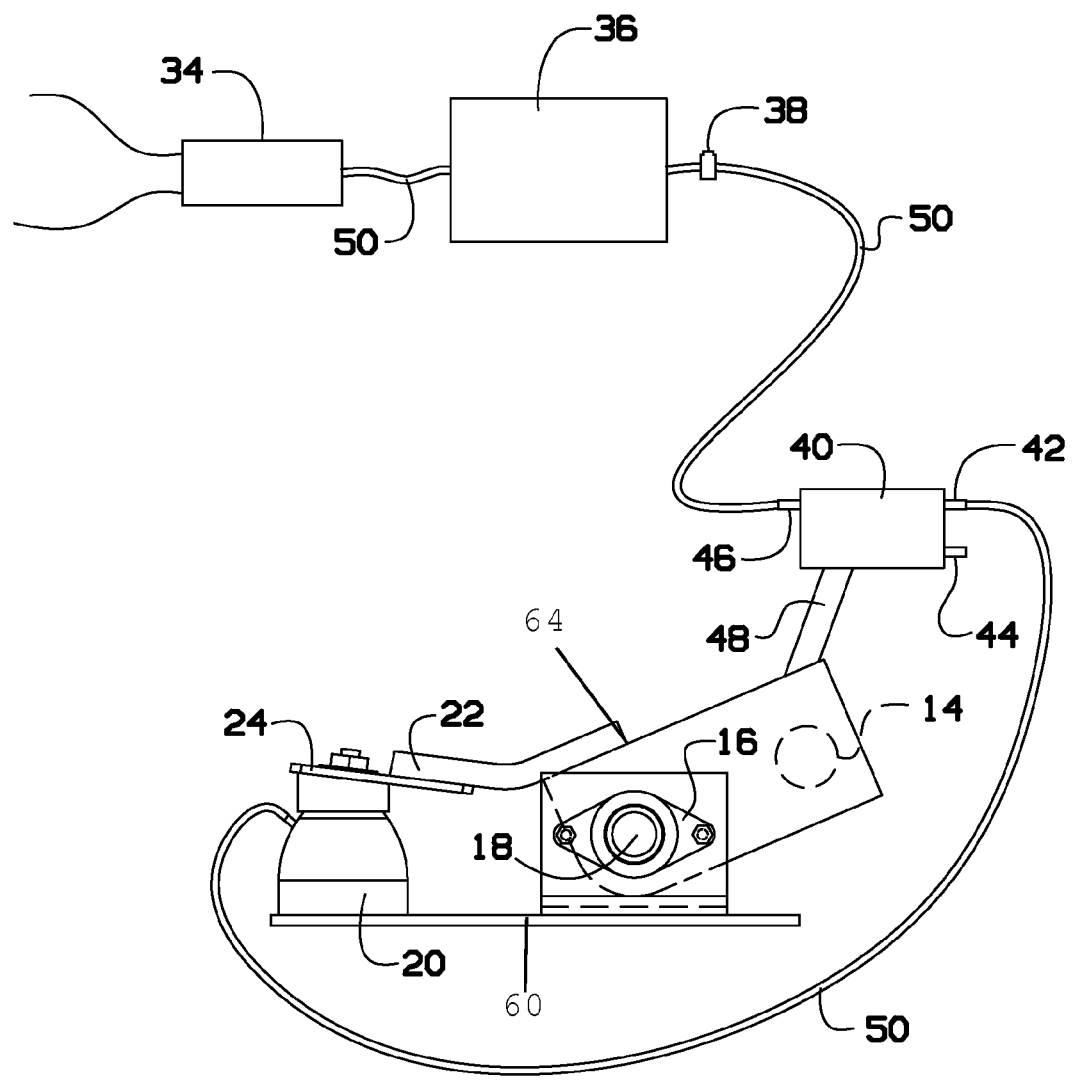
FIG. 6 is a schematic view of an alternate embodiment of the invention.

As illustrated in FIG. 6, the present invention may include an air compressor unit including an air compressor 34. For example, the present invention may include a 12 volt air compressor. The air compressor 34 may be connected to an air tank 36 via an airline hose 50. A pressure controller 38 may be connected to the air compressor unit. An airline hose 50 may connect the air tank 36 to a height control valve 40. Air may move from the airline hose 50 and into the height control valve 40 via a height control valve intake 46. An airline hose 50 may then connect the height control valve 40 to the air bladder 20. The air may leave the height control valve to the airline hose 50 via a height control valve outlet 42. The height control valve 40 may further include a height control valve exhaust 44 to relive excess pressure. The air compressor unit may be connected to the kit or vehicle via a linkage control arm 48.

In embodiments where the air bladder 20 is connected to a compressor, the vehicle such as a motorcycle, may include switches on the handle bars. This may allow a user to let air in and out of the air bladders 20 when the road crown changes without having to stop. This may be accomplished because the air compressor 34 may keep the tank 36 filled, with the pressure control valve and exhaust valve, controlled by air lines 50 that may run up to the handle bars and connected to switches, allowing the rider to vertically level the motorcycle. The automatic airing may be controlled by the air compressor which may keep the tank filled. The pressure control valve and exhaust valve may be controlled by the height control valves when it is determined that there is a change in the road slant.

Figure 4:
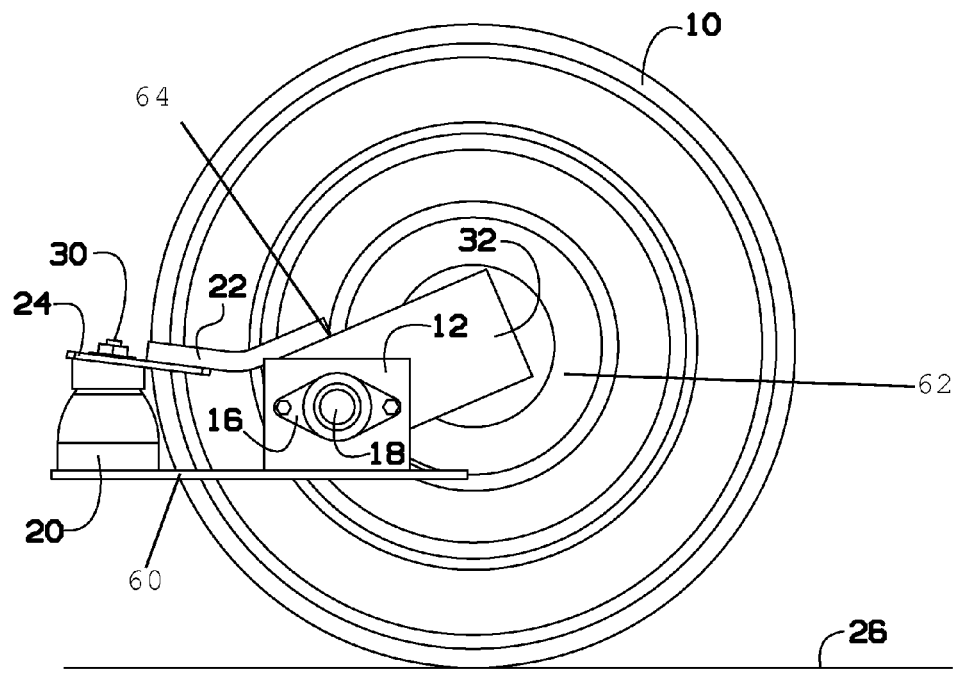
FIG. 4 is a side view of the invention shown in use on item 26 flat surface.
Figure 5:
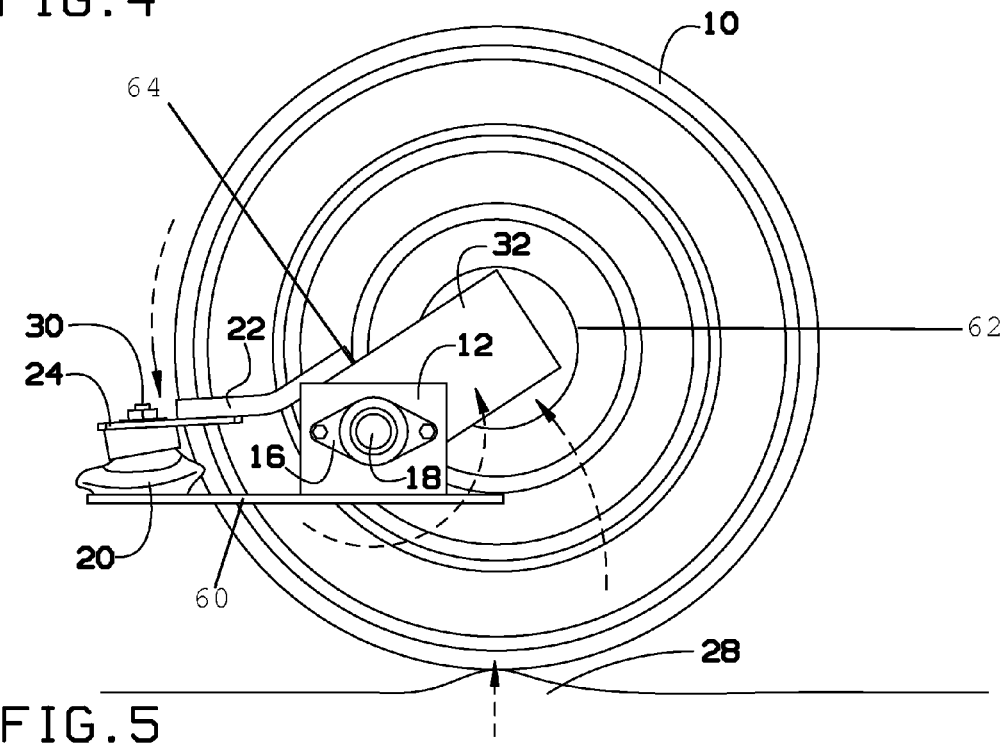
FIG. 5 is a side view of the invention shown in use interfacing with item 28 bump.

When riding on a flat surface 26, the air bladder 20 may be filled with air. The air bag suspension may absorb shock when the tires 10 hit a ripple or bump 28 in the road. As illustrated in FIGS. 4 and 5, when the tire 10 hits a bump 28, the tire 10 is pushed upwards. Due to the rotating shaft 18, the rear end of the rocker arm 64 rotates upward. The front end of the rocker arm 64, that is adjacent to the top of the air bladder 20, rotates downward and thereby presses down on the top of the air bladder 20. At least some of the air from the air bladder 20 is pushed out. Therefore, the air bladder 20 absorbs the upward force sustained by the tire 10.

Figure 7:
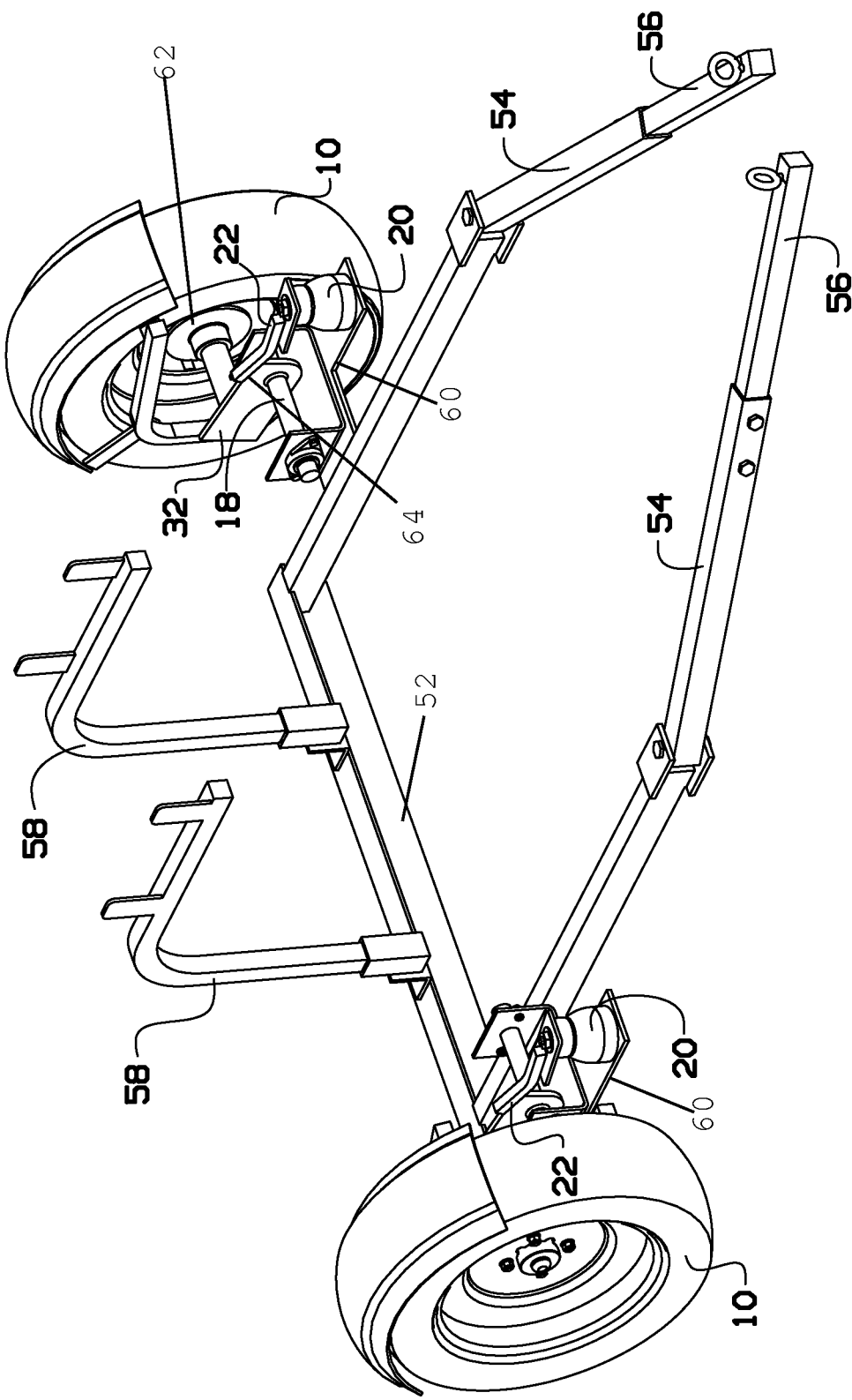

The present invention may be part of a trike kit 52, as illustrated in FIG. 7. However, the present invention is not limited to a trike kit and may be used with other vehicles. The tike kit 52 may fit and be secured to a standard motorcycle. As illustrated, pivot arms 54 and extension arms 56 may be adjusted to fit different sized motorcycles. Once adjusted, the extension arms 56 and the rear brackets 58 may be secured to a motorcycle chassis. The air bladder suspensions and tires 10 may be oriented on either side of the rear wheel of a motorcycle.

It should be understood, of course, that the foregoing relates to exemplary embodiments of the invention and that modifications may be made without departing from the spirit and scope of the invention as set forth in the following claims.

What is claimed is:

1. A shock absorbing device comprising:
   at least one base supported by a frame;
   a rocker arm having a front end and a rear end, wherein the rocker arm is pivotally connected to the base by a shaft in between the front end and the rear end of the rocker arm;
   a spindle attached to the rocker arm near the rear end, wherein the spindle is rotatably connectable to a wheel; and
   an air bladder supported by the at least one base, wherein the front end of the rocker arm is adjacent to a top of the air bladder,
   thereby the rocker arm is pivotally connected to the base in between the spindle and the air bladder.

2. The shock absorbing device of claim 1, further comprising a flange extending from the base, wherein the shaft is rotatably connected to the flange.

3. The shock absorbing device of claim 2, wherein the flange is a part of a U-shaped bracket attached to the base.

4. The shock absorbing device of claim 2, wherein the shaft is rotatably connected to the flange by a flange bearing.

5. The shock absorbing device of claim 1, wherein the rear end of the rocker arm comprises a swivel plate, and the front end of the rocker arm comprises a connection piece.

6. The shock absorbing device of claim 5, further comprising an air bladder plate attached to the top of the air bladder, wherein the connection piece is secured to the bladder plate.

7. The shock absorbing device of claim 5, wherein the air bladder plate further comprises an air valve.

8. The shock absorbing device of claim 7, wherein the air valve is configured to receive an air pump.

9. The shock absorbing device of claim 7, further comprising an air compressor connected to the air valve via an airline hose.

10. The shock absorbing device of claim 9, wherein the air compressor is activated by a switch.

11. The shock absorbing device of claim 1, wherein the frame is a tricycle motorcycle frame or tricycle kit frame.

12. A shock absorbing device comprising:
   at least one base supported by a frame, wherein the base comprises a bracket;
   a shaft having a first end and a second end, wherein the shaft is rotatably connected to the bracket near the first end of the shaft;
   a rocker arm having a front end and a rear end, wherein the shaft is connected in between the front end and the rear end of the rocker arm near the second end of the shaft;
   a spindle attached to the rocker arm near the rear end, wherein the spindle is rotatably connected to a wheel; and an air bladder supported by the at least one base, wherein the front end of the rocker arm is adjacent to a top of the air bladder.

13. The shock absorbing device of claim 12, wherein the bracket is a U-shaped bracket.

14. The shock absorbing device of claim 12, wherein the shaft is rotatably connected to the bracket by a flange bearing.

15. The shock absorbing device of claim 12, wherein the rear end of the rocker arm comprises a swivel plate, and the front end of the rocker arm comprises a connection piece.

16. The shock absorbing device of claim 15, further comprising an air bladder plate attached to the top of the air bladder, wherein the connection piece is secured to the bladder plate.

17. The shock absorbing device of claim 15, wherein the air bladder plate further comprises an air valve.

18. The shock absorbing device of claim 17, wherein the air valve is configured to receive an air pump.

19. The shock absorbing device of claim 17, further comprising an air compressor connected to the air valve via an airline hose.

20. The shock absorbing device of claim 19, wherein the air compressor is activated by a switch.

* * * * *